United States Patent
Podtchereniaev et al.

(10) Patent No.: US 6,722,145 B2
(45) Date of Patent: Apr. 20, 2004

(54) HIGH EFFICIENCY VERY-LOW TEMPERATURE MIXED REFRIGERANT SYSTEM WITH RAPID COOL DOWN

(75) Inventors: Oleg Podtchereniaev, Novato, CA (US); Kevin Flynn, Novato, CA (US); Tarrurisa Apparao, Freemont, CA (US); Mikhail Bolarski, Macungie, PA (US)

(73) Assignee: IGC-Polycold Systems, Inc., Petaluma, CA (US)

( * ) Notice: Subject to any disclaimer, the term of this patent is extended or adjusted under 35 U.S.C. 154(b) by 0 days.

(21) Appl. No.: 10/316,176

(22) Filed: Dec. 10, 2002

(65) Prior Publication Data

US 2003/0115894 A1 Jun. 26, 2003

Related U.S. Application Data

(62) Division of application No. 09/894,979, filed on Jun. 28, 2001, now abandoned.

(60) Provisional application No. 60/214,565, filed on Jun. 28, 2000, and provisional application No. 60/214,562, filed on Jun. 28, 2000.

(51) Int. Cl.$^7$ ................................................ F25B 41/04
(52) U.S. Cl. ........................................ 62/217; 252/67
(58) Field of Search ..................... 62/114, 217; 252/67

(56) References Cited

U.S. PATENT DOCUMENTS

| | | | |
|---|---|---|---|
| 6,176,102 B1 * | 1/2001 | Novak et al. | 62/612 |
| 6,258,292 B1 * | 7/2001 | Turner | 252/67 |
| 6,502,410 B2 * | 1/2003 | Podtchereniaev et al. | 62/114 |

* cited by examiner

*Primary Examiner*—Marc Norman
(74) *Attorney, Agent, or Firm*—Katten Muchin Zavis Rosenman (57) ABSTRACT

The present invention is a refrigeration system that uses a nonflammable, nonchlorinated refrigerant mixture to achieve very-low temperatures using a single compressor. The system is characterized by both high efficiency and rapid cool down time.

17 Claims, 4 Drawing Sheets

Table 1. Mixed refrigerant composition (based on refrigerant circulating through evaporator)

| | Ingredient Name | Range (% by mole) | Example (% by mole) |
|---|---|---|---|
| 1 | At least one of argon (Ar) or nitrogen (N2) | 0 – 20 | |
| 2 | R-14 (CF4) | 20 – 60 | 53 |
| 3 | R-23 (CHF3) | 10 – 40 | 19 |
| 4 | R-125 (C2HF5) | 4 – 30 | 7 |
| 5 | R-134a | 0 – 30 | |
| 6 | At least one of the following high boiling components: R-236fa, R-245fa, E-347 | 0 – 30 | 21 (R-236fa) |

*FIG. 4*

HIGH EFFICIENCY VERY-LOW TEMPERATURE MIXED REFRIGERANT SYSTEM WITH RAPID COOL DOWN

This application is a division of U.S. Ser. No. 09/894,979 filed on Jun. 28, 2001, now abandoned which claims the benefit of the following earlier file U.S. provisional patent applications No. 60/214,565, and No. 60/214,562 filed on Jun. 28, 2000.

BACKGROUND OF THE INVENTION

This invention is directed to the use of a highly efficient very-low temperature mixed refrigerant system with rapid cool down.

Refrigeration systems have been in existence since the early 1900s, when reliable sealed refrigeration systems were developed. Since that time, improvements in refrigeration technology have proven their utility in both residential and industrial settings. In particular, low-temperature refrigeration systems currently provide essential industrial functions in biomedical applications, cryoelectronics, coating operations, and semiconductor manufacturing applications. Conventional refrigeration systems have historically utilized chlorinated refrigerants, which have been determined to be detrimental to the environment and are known to contribute to ozone depletion. Thus, increasingly restrictive environmental regulations have driven the refrigeration industry away from chlorinated fluorocarbons (CFCs) to hydrochlorinated fluorocarbons (HCFCs), and more recently, to hydroflourocarbons (HFCs) due to a European Union law banning the use of HCFCs in refrigeration systems as of Jan. 1, 2001.

Traditional refrigeration systems that achieve very-low temperature cooling (−50 C. and −200 C.) using a single compressor include the Missimer, Kleemenko, and single expansion device varieties. Each of these systems employs refrigerant mixtures that are either flammable or chlorinated. The use of chlorinated refrigerants is increasingly restricted and, while flammable refrigerants are environmentally safe, they pose certain fire risks that make their inclusion into a system less desirable. What is needed is a way to achieve very-low temperature cooling using a nonflammable and nonchlorinated refrigerant mixture.

Providing refrigeration at temperatures below 223 K. (−50 C.) have many important applications, especially in industrial manufacturing and test applications. This invention relates to refrigeration systems which provide refrigeration at temperatures between 223 K. and 73 K. (−50 C. and −200 C.). The temperatures encompassed in this range are variously referred to as low, ultra low and cryogenic. For purposes of this Patent the term "very low" or very low temperature will be used to mean the temperature range of 223 K. and 73 K. (−50 C. and −200 C.).

There are many vacuum processes that have the need for such very low temperature cooling. The chief use is to provide water vapor cryopumping for vacuum systems. The very low temperature surface captures and holds water vapor molecules at a much higher rate than they are released. The net effect is to quickly and significantly lower the chamber's water vapor partial pressure. This process of water vapor cryopumping is very useful for many physical vapor deposition processes in the vacuum coating industry for electronic storage media, optical reflectors, metallized parts, etc.

Another application involves thermal radiation shielding. In this application large panels are cooled to very low temperatures. These cooled panels intercept radiant heat from vacuum chamber surfaces and heaters. This can reduce the heat load on surfaces being cooled to lower temperatures than the panels. Yet another application is the removal of heat from objects being manufactured. In some applications the object is an aluminum disc for a computer hard drive, a silicon wafer for an integrated circuit, or the material such as glass or plastic for a flat panel display. In these cases the very low temperature provides a means for removing heat from these objects more rapidly, even though the object's final temperature at the end of the process step may be higher than room temperature. Further, some applications involving, hard disc drive media, silicon wafers, or flat panel display material, involve the deposition of material onto these objects. In such cases heat is released from the object as a result of the deposition and this heat must be removed while maintaining the object within prescribed temperatures. Cooling a surface like a platen is the typical means of removing heat from such objects. In all these cases an interface between the refrigeration system and the object to be cooled is proceeding in the evaporator where the refrigerant is removing heat from the object at very low temperatures.

In traditional refrigeration systems, temperatures colder than −50° C. are usually achieved by cascade refrigeration. Cascade systems require at least two compressors, each with separate refrigeration loops, with the evaporator of the warmer stage used to condense the refrigerant of the cooler stage. The lower temperature cooling achieved with these systems unfortunately is coupled with a greater power demand and, subsequently, a loss in system efficiency, as efficiency is directly proportional to the amount of heat removed from a substance and inversely proportional to the amount of power input to the system. What is needed is a way to improve the efficiency of a very-low temperature refrigeration system.

Industrial applications that require very-low temperature cooling often specify using liquid coolants. A common characteristic of these coolants is that they become highly viscous at such temperatures. Increased viscosity at lower temperatures is a common characteristic of most liquids. These particular liquids tend to be very viscous. As a liquid coolant is pumped through a closed loop system, the pressure drop experienced by the coolant as it flows through the evaporator affects the heat load on the refrigeration system, as higher coolant pressure drop requires higher input powers. Higher input powers to achieve a given amount of heat removal results in lower efficiency. What is needed is a way to achieve very-low temperature cooling without a high coolant pressure drop.

When designing refrigeration systems for a customer, the customer dictates certain parameters that must be met in order to fit the applications for which the system is intended. One such parameter is rapid cool down. When the customer demands that a system achieve the desired heat removal within 30 minutes of initiating the system, a refrigeration system with rapid cool down capabilities is required. Additionally, the physical size of the refrigerant evaporator has a direct effect on its cool down rate. The greater the mass of copper material that is present within a refrigeration system the more time is needed for the system to reach steady state refrigeration during cool down. Therefore, what is needed is a way to achieve rapid cool down in large refrigeration systems.

Certain applications find it desirable to control the coldest temperature supplied to a liquid coolant, as many industrial coolants become highly viscous and may even freeze out which makes it difficult or impossible to pump the liquids. What is needed is a way to control the coldest temperature supplied by a refrigeration system to a coolant.

In semiconductor applications many aspects of a refrigeration product are tightly constrained. Typically, limitations are placed on system floor space requirements, system height, input power, and cost. The ability to produce a system that meets all of these limitations is not obvious. For example, providing a short cool down time may be readily achieved with a large refrigeration system. However, such a system will require more input power and more floor space than allowed. Similarly, a fast cool down time could be enabled by a very compact heat exchanger which would produce a high pressure drop and would in turn increase the thermal load on the system (due to increased pump work on the coolant) and require excessive input power. Therefore, being able to meet all of the many performance requirements is difficult.

BACKGROUND PATENTS

U.S. Pat. No. 6,112,534, "Refrigeration and heating cycle system and method," assigned to Carrier Corporation (Syracuse, N. Y.), describes an improved refrigeration system and heating/defrost cycle. The system, for heating circulating air and defrosting an enclosed area, includes a refrigerant, an evaporator using said refrigerant for heating the circulating air; and a compressor for receiving the refrigerant from the evaporator and compressing the refrigerant to a higher temperature and pressure. Advantageously, the system further includes the combination of an expansion valve positioned between the compressor and the evaporator for forming a partially expanded refrigerant, a controller for sensing system parameters, and a mechanism responsive to said controller, based on the sensed parameters, for increasing temperature differential between the refrigerant and the circulating air, for improving system efficiency and for optimizing system capacity during heating and defrost cycles.

U.S. Pat. No. 6,089,033, "High-speed evaporator defrost system," assigned to Dube, Serge (Quebec, Canada), describes a high-speed evaporator defrost system comprised of a defrost conduit circuit connected to the discharge line of one or more compressors and back to the suction header through an auxiliary reservoir capable of storing the entire refrigerant load of the refrigeration system. Auxiliary reservoir is at low pressure and is automatically flushed into the main reservoir when liquid refrigerant accumulates to a predetermined level. The auxiliary reservoir of the defrost circuit creates a pressure differential across the refrigeration coil of the evaporators sufficient to accelerate the hot high pressure refrigerant gas in the discharge line through the refrigeration coil of the evaporator to quickly defrost the refrigeration coil even at low compressor head pressures and wherein the pressure differential across the coil is in the range of from about 30 psi to 200 psi U.S. Pat. No. 6,076,372, "Variable load refrigeration system particularly for cryogenic temperatures," assigned to Praxair Technology, Inc. (Danbury, Conn.), describes a method for generating refrigeration, especially over a wide temperature range including cryogenic temperatures, wherein a non-toxic, non-flammable and low or non-ozone-depleting mixture is formed from defined components and maintained in variable load form through compression, cooling, expansion, and warming steps in a refrigeration cycle.

U.S. Pat. No. 5,749,243, "Low-temperature refrigeration system with precise temperature control," assigned to Redstone Engineering (Carbondale, Colo.), describes a low-temperature refrigeration system for accurately maintaining an instrument with a time varying heat output at a substantially constant predetermined cryogenic temperature. The refrigeration system controls the temperature of the instrument by accurately adjusting the pressure of coolant at a heat exchanger interface associated with the instrument. The pressure and flow of coolant is adjusted through the use of one or two circulation loops and/or a non-mechanical flow regulator including a heater. The refrigeration system further provides a thermal capacitor that allows for variation of the cooling output of the system relative to a cooling output provided by a cooling source.

U.S. Pat. No. 5,396,777, "Defrost controller," assigned to General Cryogenics Incorporated (Dallas, Tex.), describes a method and apparatus to refrigerate air in a compartment wherein liquid $CO_2$ is delivered through a first primary heat exchanger such that sufficient heat is absorbed to evaporate the liquid carbon dioxide to form pressurized vapor. The pressurized vapor is heated in a gas-fired heater to prevent solidification of the pressurized carbon dioxide when it is depressurized to provide isentropic expansion of the vapor through pneumatically driven fan motors into a secondary heat exchanger. Orifices in inlets to the fan motors and solenoid valves in flow lines to the fan motors keep the vapor pressurized while the heater supplies sufficient heat to prevent solidification when the $CO_2$ vapor expands through the motors. $CO_2$ vapor is routed from the second heat exchanger to chill surfaces in a dehumidifier to condense moisture from a stream of air before it flows to the heat exchangers.

SUMMARY OF THE INVENTION

The present invention is a refrigeration system that uses a nonflammable, nonchlorinated refrigerant mixture to achieve very-low temperatures using a single compressor. The system is characterized by both high efficiency and rapid cool down time.

BRIEF DESCRIPTION OF THE DRAWINGS

For better understanding of the invention, reference is had to the following description taken in connection with the accompanying drawings, in which.

DESCRIPTION OF PREFERRED EMBODIMENTS

Figure 1:
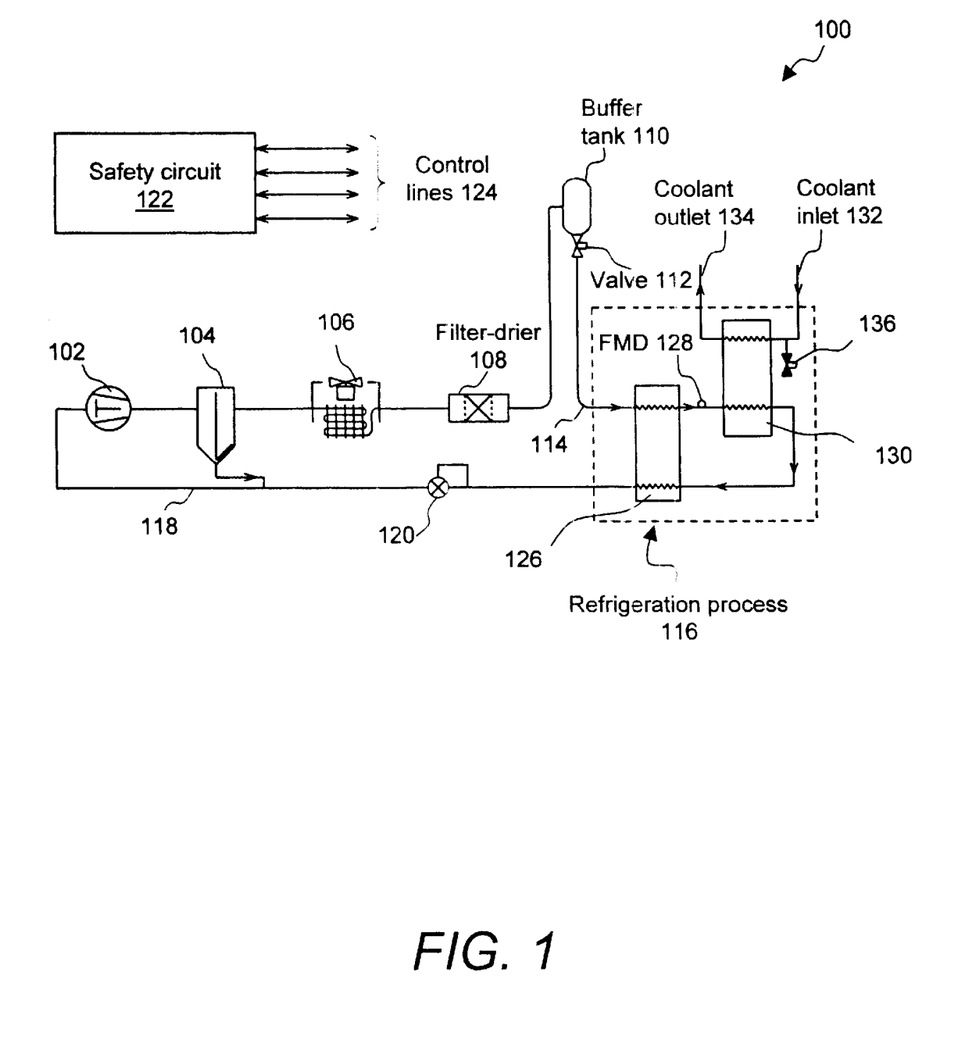
FIG. 1 is a block diagram of a refrigeration system which removes heat from a coolant in accordance with the invention.

In a first embodiment, FIG. 1 is a diagram of a refrigeration system 100 in accordance with the invention. Refrigeration system 100 includes a compressor 102 feeding an optional oil separator 104 that feeds a condenser 106. An outlet of condenser 106 feeds a filter-drier 108 that subsequently feeds an inlet of a buffer tank 110 whose outlet feeds a buffer tank valve 112 feeding a supply inlet of a refrigeration process 116 via a liquid line 114. A return outlet of refrigeration process 116 closes the loop back to compressor 102 via a compressor suction line 118. In compressor suction line 118 between refrigeration process 116 and compressor 102 is an evaporator pressure regulating (EPR) valve 120. Refrigeration system 100 further includes a safety circuit 122. Refrigeration process 116 is also referred to as a cryoblock.

Refrigeration process 116 further includes a regenerative heat exchanger 126 whose supply inlet is fed by liquid line 114. A supply outlet of regenerative heat exchanger 126 feeds a flow metering device (FMD) 128 that feeds a supply inlet of an evaporator 130. A return outlet of evaporator 130 feeds a return inlet of regenerative heat exchanger 126 whose return outlet feeds compressor suction line 118. A secondary coolant loop (not shown in its entirety) accesses evaporator 130 via a coolant inlet 132 and a coolant outlet 134. Additionally, a liquid drain valve 136 is connected to coolant inlet 132 of evaporator 130.

Coolant hereafter refers to the substance from which heat is to be removed by refrigeration system 100, while refrigerant refers to the substance that removes heat from the coolant by being warmed and or vaporizing. The coolant for which refrigeration system 100 was originally designed is the highly viscous HT 70 by Galden, although those skilled in the art will readily perceive that refrigeration system 100 lends itself to a wide array of industrial coolants.

Compressor assembly 102 pumps refrigerant and maintains an adequate pressure, to force enough refrigerant to flow to meet the cooling requirements of refrigeration system 100. Compressor assembly 102 is a conventional compressor that takes low-pressure, low-temperature refrigerant gas from refrigeration process 116 and compresses it to high-pressure, high-temperature gas that is fed to oil separator 104 to be cooled and partially liquefied by condenser 106. The typical operating pressure of refrigerant leaving compressor assembly 102 is between 10.0 and 20.7 bars, at a typical temperature of +105 C. When exiting the condenser, the refrigerant pressure is typically unchanged e.g. a pressure drop of 1 bar, and the temperature is typically 20 C. to 35 C.

Optional oil separator 104 is a conventional 1.4-liter oil separator with an maximum working pressure of 31.0 bars, in which the compressed mass flow from compressor assembly 102 enters into a larger separator that removes most of the oil from the refrigerant gas. The removed oil is returned to compressor 102 via compressor suction line 118. The mass flow from oil separator 104, minus the oil removed, continues to flow onward to condenser 106 and subsequently to refrigeration process 116. The oil separator is not needed if the compressor is oil free. If an oil lubricated compressor is used, an oil separator is not needed when the amount of the oil in the refrigerant gas exiting the compressor is low enough to work reliably in the refrigeration system (i.e. without separating and freezing out at the lowest temperature of the evaporator).

Condenser 106 is a conventional air-cooled or water-cooled condenser, and is the part of the system where the heat is rejected by condensation. As the hot gas travels through condenser 106, it is cooled by air or water passing over it. As the hot gas refrigerant cools, drops of liquid refrigerant form within its coil. Eventually, when the gas reaches the end of condenser 106, it has condensed partially; that is, liquid and vapor refrigerant are present. In order for condenser 106 to function correctly, the fluid passing through the condenser 106 must be cooler than the working fluid of the system.

Filter-drier 108 is a conventional filter drier that traps any moisture contained in the refrigerant mixture, thereby preventing moisture that may cause icing from propagating to downstream elements of refrigeration system 100, such as to FMD 128.

Buffer tank 110 is a relatively small tank (for example, 2.8 liter and maximum working pressure equal to 34.4 bars) that stores gases and controls the pressure of liquid line 114. Buffer tank 110 is particularly important during the start up of refrigeration system 100. Receiver tank valve 112 is typically locked open to allow continuous flow of refrigerant from buffer tank 110 to refrigeration process 116.

Refrigeration process 116 includes components that remove heat from a coolant by exchange with the refrigerant. Regenerative heat exchanger 126 is a heat exchanger that warms refrigerant exiting evaporator 130 to near room temperature and cools refrigerant exiting condenser 106.

FMD 128 is any conventional flow metering device, such as a capillary tube, orifice, ventori, proportional valve with feedback, porous plug or any restrictive element that produces a throttling effect of the refrigerant and causes a refrigeration effect. It is sized or controlled to limit flow and achieve the desired operating refrigerant pressures of the system when operating in combination with the compressor, condenser, and regernerative heat exchanger.

Evaporator 130 is a compact efficient shell and finned coil heat exchanger as described herein and in an application filed concurrently herewith. Refrigerant evaporates and absorbs heat from the coolant within evaporator 130.

Coolant inlet 132 is a line through which warm coolant is pumped into evaporator 130 from the secondary coolant loop. Coolant outlet 134 is a line through which cooled coolant is pumped out of evaporator 130 into the secondary coolant loop.

Liquid drain valve 136 is a normally closed valve located at the bottom of the liquid loop at coolant inlet 132 and is not usually used during operation. This valve is only used when it is required that liquid coolant be filled or drained out of refrigeration system 100. Effective draining of the coolant is important due to the high cost of liquid coolants. Further, liquid drain valve 136 provides a port that is used to fill the coolant passages of refrigeration system 100. This is also very important because trapped air or gas in a liquid loop decreases pump displacement. Therefore liquid drain valve 136 must be the lowest point of the coolant loop and must have direct plumbing that is continuously downward to prevent the possibility of having any trapped air or gas.

In an alternative arrangement, the refrigeration process 116 shown in FIG. 1 could be modified. One modification includes at least one phase separator and may include additional heat exchangers. Such an arrangement is shown in FIG. 3 which is an alternative construction of the regenerative heat exchanger 126.

Figure 3:
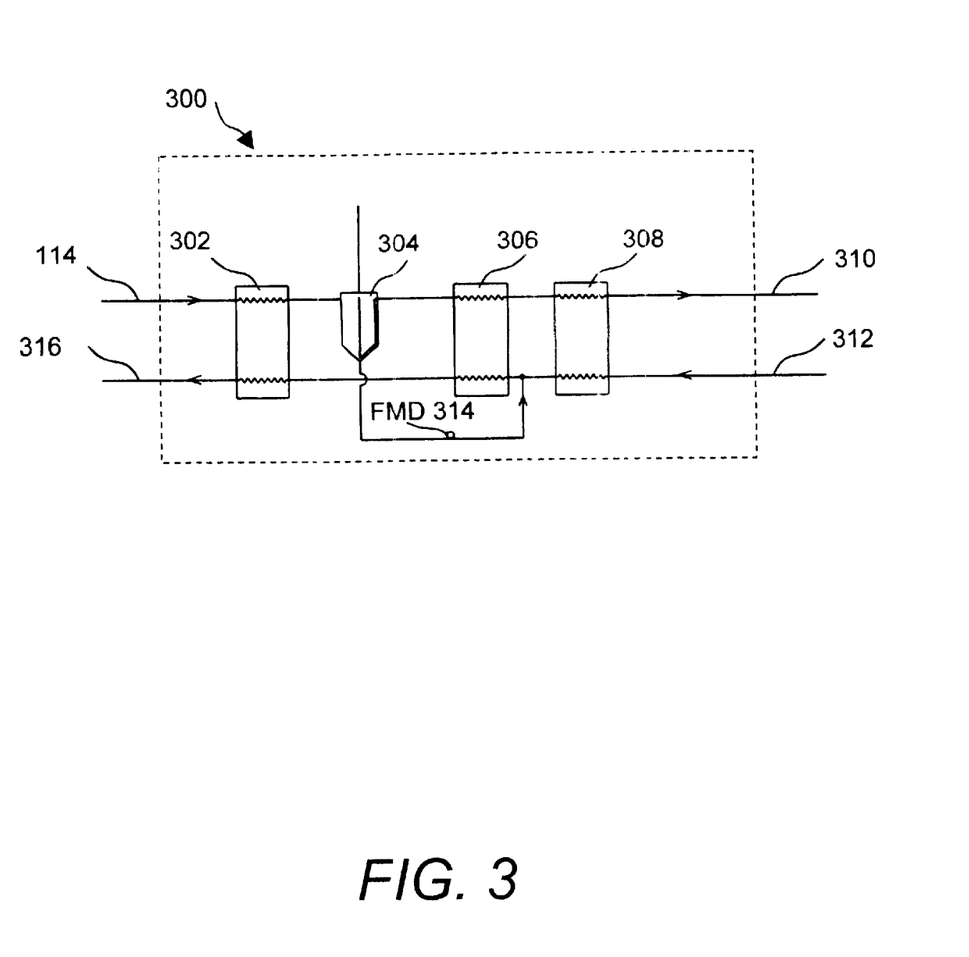
FIG. 3 is a block diagram of an alternative portion of the refrigeration process in accordance with the invention.

FIG. 3 shows a single phase separator arrangement 300, in accordance with the invention, which has the identical refrigerant flow inputs and outputs as heat exchanger 126. High pressure refrigerant enters optional heat exchanger 302 via liquid line 114. High pressure refrigerant exits via line 310 which feeds FMD 128. Low pressure refrigerant returning from evaporator 130 enters via line 312. Low pressure refrigerant exits via line 316. The flow between the various components is as follows. Liquid line refrigerant enters optional heat exchanger 302 via line 114 and exits into liquid-vapor phase separator 304. Liquid-vapor phase separator 304 separates the flow into two streams, one that is mainly liquid and the other that is mainly vapor. The vapor stream feeds heat exchanger 306 which in turn feeds heat exchanger 308 which in turn exits via line 310. Low pressure refrigerant enters via line 312 which feeds heat exchanger 308 which in turn feeds heat exchanger 306 which in turn feeds heat exchanger 302 which exits via line 316. The liquid stream separated by phase separator 304 is throttled to low pressure by FMD 314 and is blended with low pressure refrigerant at a node between heat exchangers 308 and 306. The purpose of heat exchangers 302, 306 and 308 is to exchange heat between the high pressure and low pressure refrigerant streams flowing through each heat exchanger.

To achieve high efficiency, the temperature of phase separator 304 needs to be near room temperature or slightly chilled below room temperature. Therefore heat exchanger 302 is optional. Its need will be determined by the specific application.

Heat exchanger 306 is required to return the throttled refrigerant exiting FMD 314 to suction refrigerant of the appropriate temperature to maximize the heat transfer potential of the low pressure stream. It is a required heat exchanger if heat exchanger 302 is not used. If heat exchanger 302 is used, heat exchanger 306 is optional. Its need will be determined by the operating characteristics of heat exchangers 302 and 308.

FIG. 3 illustrates one possible arrangement. Many other similar arrangements are possible, including various arrangements of FMD's, heat exchangers and phase separators. An arrangement (not shown) with multiple phase separators is also considered within the scope of this invention. However, a preferred embodiment has to use no phase separator, or a single phase separator. The goal in each of these arrangements is to achieve superior refrigeration system efficiency, especially relative to the traditional cascade refrigeration system, with each stage containing a single refrigerant, or refrigerant blend with components having closely spaced normal boiling points. Such systems have inherent inefficiencies. The intent of this invention is to provide superior performance for a given amount of heat removal at a specified temperature. This considers that such a comparison should be based on compressors of similar construction and efficiency, and that the mixed refrigerant systems using a single compressor will benefit from a slightly higher efficiency by virtue of having a large displacement.

FIG. 1 associates with a single refrigerant evaporator cooling a single coolant flow path. Cooling of multiple coolant paths with one or more evaporators is also possible. In the general case, refrigerant from regenerative heat exchanger 126 feeds two or more FMD's arranged in parallel. These in turn feed two or more independent evaporators arranged in parallel, each of which cools independent coolant flow paths. The return refrigerant from each evaporator is mixed together and returned to the low pressure inlet of the regenerative heat exchanger 226 (and alternatively to arrangement 300). In other arrangements, the independent coolant flow paths are cooled by evaporators arranged in series. In one such arrangement refrigerant exiting from one evaporator feeds into the next. The final evaporator returns its refrigerant to regenerative heat exchanger 226 (and alternatively to arrangement 300). Finally, various combinations of series and parallel evaporator arrangements are possible.

Table 1 (FIG. 4) is a listing of the refrigerant mixtures of the present invention, including Argon or Nitrogen, along with R-14, R-23, R-125, R-134a, R-236fa, R-245fa, E-347.

Figure 4:
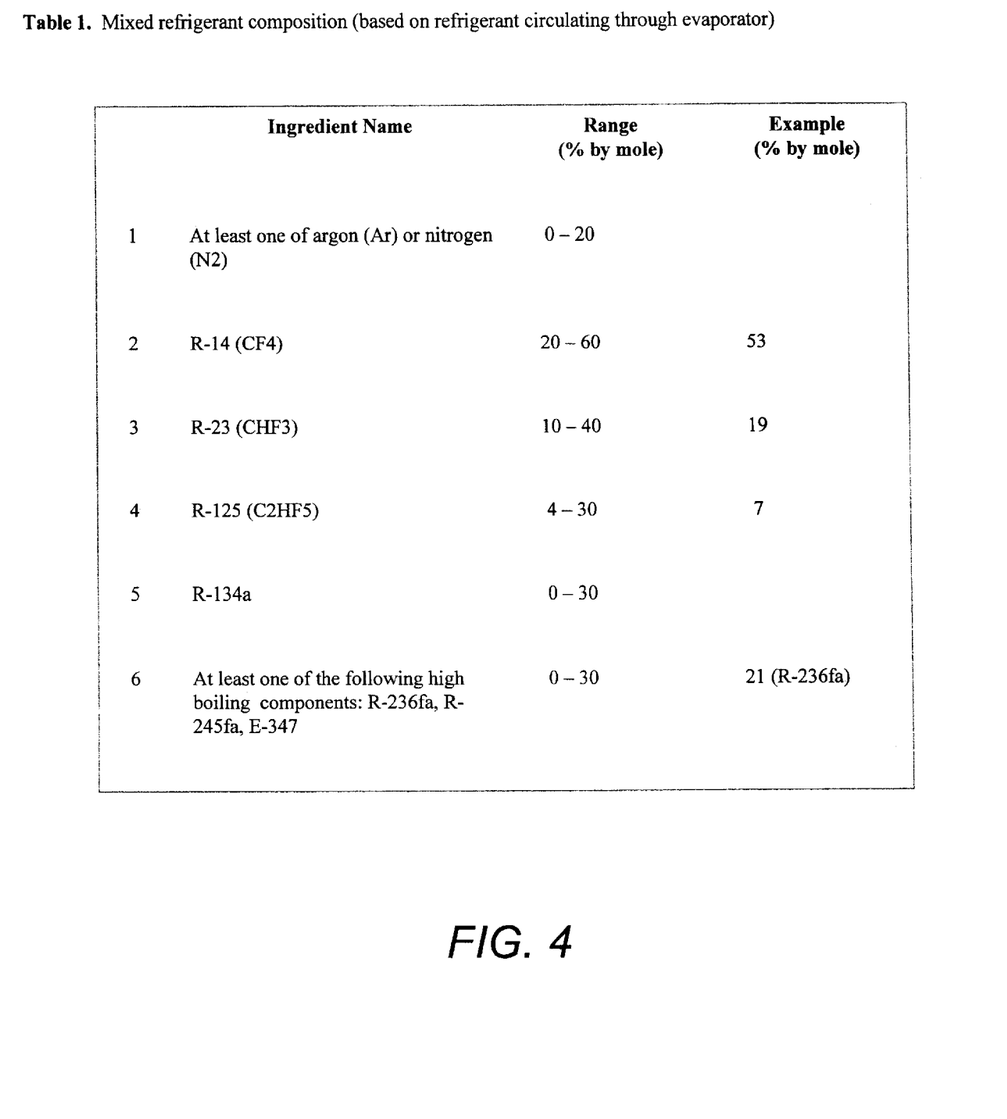
FIG. 4 is Table 1 which lists refrigerant compositions in accordance with the invention.

Table 1 lists the ingredients to refrigerant mixture of the present invention that enable the refrigeration system to accomplish a high-efficiency, very-low temperature refrigeration cycle while using a nonflammable, nonchlorinated refrigerant mixture. With the exception of E-347, all refrigerants listed are designated in accordance with American Society of Heating and Refrigeration and Air Conditioning Engineering (ASHRAE) standard No. 34.

E-347 is known as 1-(methoxy)-1,1,2,2,3,3,3-heptafluoropropane (also CH3-O—CF2-CF2-CF3), 3 M product reference Hydrofluoroether 301.

The Example column of Table 1 lists the specific composition applied with favorable results in a system developed in accordance with the invention. The specific system developed was arranged as shown in FIG. 1. An overall blend composition in the column labeled "Range" in Table 1 identifies ranges of compositions that fall within the scope of this invention. Within these ranges the number of compositions and their performances are potentially infinite.

The warmer boiling components, R-236fa, R-245fa, and E-347 are considered to be interchangeable with each other. These three components may not be used at all in a mixture. In this case, most systems will not have any condensed refrigerant formed in a room temperature condenser. This limits the amount of heat that can be rejected by the system and thereby reduces amount of heat that can removed by the evaporator. Although this may be beneficial in rare circumstances, the preferred embodiment contains enough high boiling components to enable condensed refrigerant to form in the condenser since this will generally produce higher system efficiency.

Further, in accordance with the invention, another component may be added to the above compositions provided that the ratios of the listed components (Table 1) remain in the same proportions relative to each other.

Another feature, in accordance with the invention, an EPR valve 120 used to regulate the lowest refrigerant temperature (in combination with other system elements) and thus prevent the coolant from becoming excessively cold. EPR valve 120 is a standard refrigeration valve, normally used for single component refrigerants or blends of refrigerants having closely spaced boiling points and, thus, is unique in its application to refrigeration system 100, in which a refrigeration mixture with widely spaced boiling points is incorporated. The refrigerant composition is disclosed in additional detail in Poly 17.490. The primary function of this type of valve is to prevent the pressure of evaporator 130 from falling below a predetermined value to which the valve has been set. When properly adjusted for a particular system, EPR 120 keeps the temperature of the refrigerant from falling below a certain lower limit. That temperature limit is therefore able to be influenced by adjustment of EPR valve 120. Examples of this commercially available valve are the ORIT valves manufactured by Sporlan Valve Company (Washington, Mo.), or similar valves made by Alco (St. Louis, Mo.) and Danfoss (Nordburg, Denmark). The use of EPR valve 120 is further described in a concurrently filed application (Docket POLY 18.764).

In operation, EPR 120 regulates the refrigerant pressure within evaporator 130 and thereby prevents the coolant from falling below −100 C., although EPR 120 may be adjusted to a wide range of pressure set points. EPR 120 is also used to prevent freeze-out of the refrigerant components by acting to maintain a minimum suction pressure, thereby keeping the suction pressure of refrigeration system 100 from dropping too low. As the suction pressure gets lower the temperature tends to drop, if a freeze out condition occurs the suction pressure tends to drop creating positive feedback and further reducing the temperature, causing even more freeze out.

Another feature of EPR 120 is the regulation of the minimum coolant temperature. By setting the EPR to limit the refrigerant temperature the coldest refrigerant temperature is limited, thereby limiting the temperature to which the coolant can be cooled.

Conventional refrigeration systems use a single component refrigerant or refrigerant components with closely spaced boiling points so as to emulate the properties of single refrigerants. The mixed refrigerants disclosed in this application have a range of boiling points that is at least 50 C., and more, typically 100 C. or more. The result is that there is no close relationship between temperature and pressure as with single component refrigerants. Therefore, setting the pressure by itself is insufficient to know what the controlled temperature will be. Additionally, the standard application of the EPR valve has it located at the outlet of the evaporator. The temperatures produced by these systems are colder than −50 C. and are typically colder than the valves are rated for, especially if they use elastomer seals.

The use of the EPR valve as shown in this application addresses the low temperature exposure issue by locating it on the suction line where the refrigerant temperature is always warm enough (typically 0 C. or warmer) to meet the design requirements of the valve, provided that the system is properly designed. The valve is set when there is a minimal load on refrigeration system 100, that is, when there is no applied thermal load on the evaporator. This provides an empirical way to set the valve and adjust it further until the desired refrigerant evaporator temperatures are achieved. The factors effecting the equilibrium temperature are the pressure setting, the refrigerant mixture, the heat load on the evaporator, and the sizing of the regenerative heat exchanger 126 (or the sizing of alternative heat exchangers as described in FIG. 3). In contrast, a conventional application of the EPR valve requires only knowledge of the refrigerant properties to determine the required pressure setting.

There are many control devices included within refrigeration system 100, which are for simplicity not shown in FIG. 1. Safety circuit 122 provides control to, and receives feedback from, the plurality of control devices included within refrigeration system 100, such as pressure switches and thermally coupled temperature switches, via control lines 124. Control lines 124 feeding the control devices are electrical in nature. Likewise, the feedback from the various sensing devices via control lines 124 of safety circuit 122, are electrical in nature.

Refrigeration system 100 is designed to remove heat from industrial coolants such as Galden HT 70, which is widely used in applications such as in the semiconductor industry. The industrial coolant enters refrigeration system 100 via coolant inlet 132 and exits refrigeration system 100 as a very low temperature liquid between −50 C. and −125 C. through coolant outlet 134. The nonflammable, nonchlorinated refrigerant mixture used in the present invention is disclosed in provisional applications No. 60/214,562 and (Docket Poly 18.720P, filed Jun. 1, 2001).

Further examples of industrial coolants include, but are not limited to: Galden HT-200 (Ausimont USA, Inc., Thorofare, N. J.), Galden HT 55 (Ausimont USA, Inc.), Novec HFE-7100 (3M company, St. Paul, Minn.), Novec HFE-7200 (3M company), Novec HFE-8401 HT (3M company), FC 77 (3M company), Galden HT-200. Note: Galden is a registered trademark of Ausimont, and Novec is a trademark of 3M.

For purposes of this application these highly viscous fluids are characterized by having a kinematic viscosity of at least 0.2 centistokes at 25 C. This is a typical temperature that viscosity data is available for. The viscosity becomes much higher at very low temperatures.

The discharge and suction pressure for refrigeration system 100 are maintained within the normal operating range of compressor 102. Typical suction pressures range from 2 to 6 bar absolute. Typical discharge pressures range from 10 to 30 bar absolute. While the present invention is a single stage system (no phase separators), a two-stage system (single phase separator) may be attained by the present invention with the inclusion of a phase separator and an additional expansion device. However, the inclusion of a phase separator decreases the simplicity of the system but if the separator temperature is 10 C. or warmer, the efficiency of the system 100 will be improved. Such a phase separator can obviate the need for oil separator 104.

In addition to the special refrigerant mixture disclosed in Poly 17.490, filed concurrently, and Poly 18.720P, certain key elements included in refrigeration system 100 contribute to the high efficiency of refrigeration system 100. Temperatures below −50 K. normally are achieved by cascade systems, in which a separate compressor is included for each refrigerant; however, the present invention implements a single-compressor design that accommodates the entire refrigerant mixture to achieve the same temperatures. The size of a compressor is closely related to its efficiency, with larger compressors having greater efficiencies. The compressors commonly used in cascade systems are relatively small, and thus, have a low efficiency associated with them. The inclusion of a plurality of such low efficiency compressors results in an even greater overall system inefficiency. Compressor 102 is larger than the compressors used in plurality in cascade systems, and helps achieve a simpler, more compact system design while achieving increased system efficiency. Further, since cascade refrigeration systems require additional heat exchangers which result in lower thermodynamic efficiencies, (due to the required temperature difference to cause heat transfer, and due to the pressure drop in the heat exchangers), they are inherently less efficient.

To establish a reference for refrigeration efficiency a comparison relative to the best that is thermodynamically possible will be used. For refrigeration systems the comparison is between the actual coefficient of performance (COP) compared to the coefficient of performance for an ideal cycle (COP ideal). An advantage of this method is that it takes into account the fact that providing refrigeration at lower temperatures is more difficult than at warmer temperatures.

The COP is defined as the ratio between heat removed by the evaporator to the heat rejected by the condenser. The COP ideal is defined as the ratio of evaporator temperature and the difference between the temperature of the cooling media used to cool the condenser and the temperature of the evaporator. For purposes of this application, the evaporator temperature is defined by the average of the refrigerant temperature at the inlet and outlet of the evaporator. For calculations of the COP, the temperatures must be in absolute units (i.e. Kelvin). In the current example system the refrigerant inlet temperature is about −81 C. and the refrigerant outlet temperature is about −74 C. For an air temperature of 30 C. (used to cool the condenser), the COP ideal has a value of 1.8 (195.5 K./(303 K.-195.5 K). The actual COP is 0.278 (500 W/1800 W). The efficiency relative to ideal is 15.4%.

These are the results achieved at the design condition for a small system (1.5 horsepower) with a relatively low efficiency compressor. Larger scale systems will realize higher efficiencies due to the use of large, more efficient compressors. However, in comparison to cascade systems, mixed refrigerant systems will be more efficient relative to the COP ideal.

Figure 2:
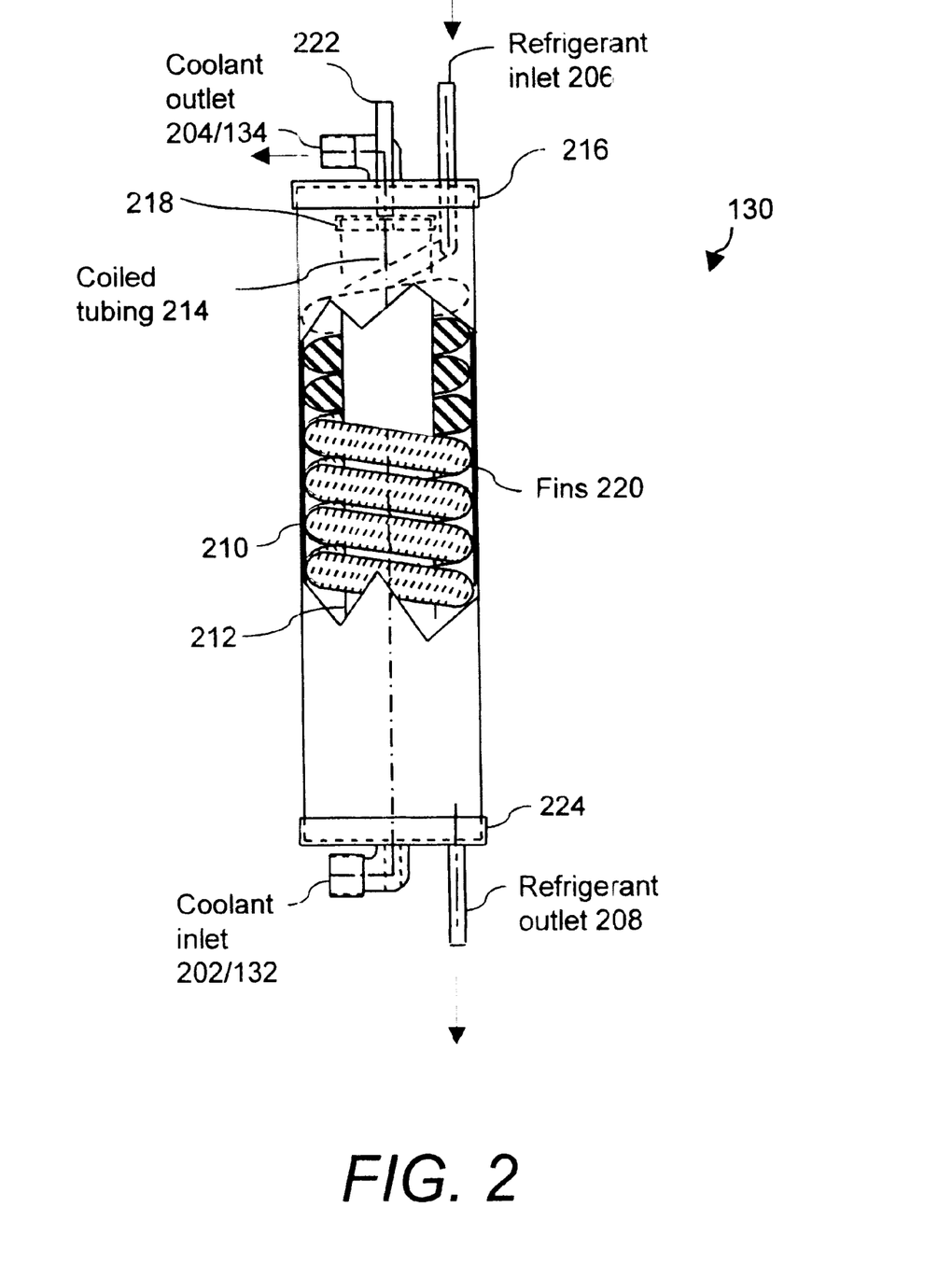
FIG. 2 is a drawing of the refrigerant evaporator of FIG. 1 which exchanges heat with and cools the coolant, in accordance with the invention.

As shown in FIG. 2, in accordance with the invention, a special, low pressure drop evaporator design is used to cool the coolant. An important element to the increased efficiency of refrigeration system 100 is the unique evaporator 130. Evaporator 130 is a low mass, low volume evaporator that achieves very-low temperature cooling while maintaining a low coolant pressure drop. A low coolant pressure drop is required for high efficiency because the pump work imparted to the coolant increases the heat that must be removed by refrigeration system 100. Therefore a low pressure drop for the coolant heat exchanger is an important factor in achieving a high efficiency. Achieving a low coolant pressure drop is challenging since many of the industrial coolants that are used have very high viscosity at low temperatures.

As a specific example, Galden HT 70 has a viscosity of 10 centistokes at −80 C. The uniqueness of evaporator 130 includes a helically wound evaporator coil with brazed copper, aluminum, or stainless steel fins. The flow of coolant occurs crosswise to the tube length and roughly crossflow/counterflow to the direction of the refrigerant flow. As a result of the small size of evaporator 130, there is always a small volume of refrigerant in evaporator 130, thereby reducing the required size of buffer tank 110. A smaller buffer tank 110 lends itself nicely to achieving a more simplistic system design and a compact form, and the size of evaporator 130 helps to achieve a shorter system start-up time due to the smaller mass of copper requiring cool down. In contrast, alternative designs can provide effective heat transfer with low pressure drop. However, these designs required additional refrigerant volume, which required additional buffer volume, which resulted in an unacceptably large system size.

Referring to FIG. 2, the main elements are as follows. Refrigerant inlet 206 feeds coiled tubing 214 which in turn feeds refrigerant outlet 208. As refrigerant flows through coiled tubing 214 it receives heat from the coolant. Coolant flows into the heat exchanger through coolant inlet 202 (which corresponds to coolant inlet 132 of FIG. 1). In the heat exchanger it is cooled by the refrigerant and exits from coolant outlet 204 (which corresponds to coolant outlet 134 of FIG. 1). The heat exchanger shell is formed by external cylinder 210 and two caps 216, 224. Inner cylinder 212 is capped at two ends by caps 218. Only one cap 218 is shown, but a second identical cap is used at the opposite end of cylinder. Support 222 is used to fix the inner cylinder's position relative to the caps of the outer cylinder. Heat transfer between the coolant and heat exchanger is made efficient by the use of fins 220 attached to coiled tubing 214.

The fins 220 are made of a conductive metal that is thermally bonded to the tubing. The fins have a constant height relative to the tube and are formed by a metal ribbon that is wrapped around the tubing in a helix. The width of the ribbon extends perpendicular to (generally radially from) the tube and is referred to as the fin height. When viewing a straight length of finned tubing along the tube axis the fins are viewed as circles, with an outside diameter equaling the diameter of the tube plus twice the fin height (ribbon width). The fins are spaced at specific interval, typically 0.3 to 0.06 inches.

In one specific example the requirement was to limit input power to 1800 W, provide initial cooling within 30 minutes of start, and remove 500 Watts from a stream of Galden HT 70 flowing at 200 gram/sec to achieve a final coolant temperature of −74 C. with a coolant pressure drop not to exceed 2 psi. The specific system that enabled this capability was a system with a 1.5 horse-power compressor using a refrigerant mixture circulating with a composition as shown in Table 1. The evaporator had a total mass of about 12 pounds without coolant. This mass consisted entirely of copper. The total coolant volume was about 100 cubic inches. The inner cylinder and caps minimized the volume of coolant in the evaporator. This limited the coolant initially cooled during system start up. The inner cylinder, along with the inner surface of cylinder 210, prevented coolant flow from bypassing the finned tubing. Coiled tubing 214 has a diameter of 0.375 inches. The fins 220 attached to the tubing are 0.25 inch high, have a thickness of 0.015 inch, and have a spacing of about 0.06 to 0.07 inches. The finned tubing is, of a commercially available type such as that provided by Heat Exchange Applied Technology (Orrville, Ohio). Inner cylinder 212 has a diameter of about 2.13 inches and outer cylinder 210 has a diameter of about 4 inches and a length of about 12 inches. The total heat transfer surface area of the heat exchanger (provided mainly by the finned tubing) is about 16 square feet.

The evaporator 130 design meets all of the important requirements for this refrigeration system.

It will thus thus been seen that the objects set forth above, among those made apparent from the preceding description, are efficiently attained, and since certain changes amy be made in the above refrigerant blend without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which might be said to fall therebetween.

What is claimed is:

1. A very low temperature refrigeration system utilizing a mixed refrigerant comprising, in fluid connection, at least one compressor, a condenser, refrigerant-to-refrigerant heat exchanger, flow metering device, and evaporator, wherein the refrigerant is a nonflammable, nonchlorinated, multi-component refrigerant, the lowest boiling point and the highest boiling point components of the refrigerant have normal boiling temperatures that vary in the range of at least 50° C., wherein the refrigerant comprises, in mole percent, a) at least one of argon and nitrogen in a combined total amount of from about 0% to about 20%;
   b) R-14 in the range of from about 20% to about 60%
   c) R-23 in the range of from about 10% to about 40%
   d) R-125 in the range of from about 4% to about 30%
   e) R-134a in the range of from about 0% to about 30%
   f) at least one of R-236fa, R-245fa, and E-347 in a combined total amount of from about 0% to about 30%; and
   g) at least one of R-236fa, R-245fa, and E-347 and R-134a in a combined total amount of from about 10% to about 50%.

2. The refrigeration system of claim 1 wherein the components of the refrigerant have normal boiling temperatures that vary in the range of it least 100° C.

3. The refrigeration system of claim 1 wherein said refrigerant-to-refrigerant heat exchanger is a counter-flow heat exchanger.

4. The refrigeration system of claim 1 wherein a buffer tank receives said refrigerant from said condenser unit and delivers said refrigerant to said refrigerant heat exchanger.

5. A refrigeration system as in claim 1 where in the actual system efficiency, relative to ideal, as measured by the coefficient of performance is at least 15%.

6. The refrigeration system of claim 1 wherein the coolant is a liquid coolant having a kinematic viscosity of at least 0.2 centistokes at 25 C., and 2 centistokes at −80 C. and causes a pressure drop of 5 PSI or less.

7. The refrigeration system of claim 1 wherein the mixed refrigerant comprises 53 mole percent R-14; 19 mole percent of R-23; 7 mole percent of R-125, and 21 percent of R-236fa.

8. The refrigeration system of claim 1 comprising a single compressor train.

9. The refrigeration system of claim 1 comprising a single compressor.

10. A very low temperature refrigeration system utilizing a mixed refrigerant comprising, in fluid connection, at least one compressor, a condenser, refrigerant-to-refrigerant heat exchanger, flow metering device, and evaporator, wherein the refrigerant is a nonflammable, nonchlorinated, multicomponent refrigerant, each component of the refrigerant is nontoxic when in admixture in the multicomponent refrigerant and the lowest boiling point and the highest boiling point components of the refrigerant have normal boiling temperatures that vary in the range of at least 50° C., such system further comprising a control valve receiving low pressure refrigerant flow from the refrigerant-to-refrigerant heat exchanger and outputting said refrigerant flow to the compressor inlet, said control valve maintaining a selected minimum level of said low pressure at an inlet and controlling said low pressure.

11. A very low temperature refrigeration system utilizing a mixed refrigerant comprising, in fluid connection, at least one compressor, a condenser, refrigerant-to-refrigerant heat exchanger, flow metering device, and evaporator, wherein the refrigerant is a nonflammable, nonchlorinated, multicomponent refrigerant, the lowest boiling point and the highest boiling point components of the refrigerant have normal boiling temperatures that vary in the range of at least 50° C., where the coolant has a kinematic viscosity of at least 0.2 centistokes at 25 C., and 2 centistokes at −80 C.

12. A low temperature closed cycle refrigeration system comprising:
   a single compressor with an outlet delivering a refrigerant flow at high pressure and an inlet receiving said refrigerant flow at low pressure;
   a condenser unit receiving said high-pressure refrigerant flow from said compressor and removing heat therefrom;
   an evaporator receiving said refrigerant flow from said condenser unit at low pressure and low temperature and returning said refrigerant flow to said compressor inlet;
   a flow metering device between said condenser unit and said evaporator to reduce said high pressure from said compressor to said low pressure in said evaporator and to lower the temperature of said refrigerant flow; and
   a refrigerant circulating in said closed cycle without refrigerant freeze-out at said low pressure, said refrigerant being a mixed refrigerant, the components of said mixed refrigerant having a range of respective normal boiling temperatures of at least 50° C. where said mixed refrigerant is composed in mole percentage of the following:
   at least one of Argon and nitrogen in a range of 0 to 20%
   R-14 in a range of 20–60%;
   R-23 in a range of 10–40%;
   R-125 in a range of 4–30%;
   R-134a in a range of 0–30%;
   at least one of the following high boiling components: R-236fa, R-245fa, and E-347.

13. A refrigeration system as in claim 12, wherein said mixed refrigerant is 53 mole percent of R-14; 19 mole percent of R-23; 7 mole percent of R-125, and 21 percent of R-236fa.

14. The refrigeration system of claim 12, and further comprising a control valve receiving said low pressure refrigerant flow from said evaporator and outputting said refrigerant flow to said compressor inlet, said control valve maintaining a selected level of said low pressure at an inlet of said control valve and controlling said evaporator pressure.

15. A refrigeration system as in claim 12, wherein said evaporator includes a helical coil of finned tubing located in a first cylinder, said finned tubing being wrapped around a second cylinder within said first cylinder, said evaporator cooling a coolant that flows within said first cylinder and over said finned tubing in a cross-flow/counter flow arrangement, said refrigerant flow through said finned tubing exchanges heat and cools said coolant.

16. The refrigeration system as in claim 15, further comprising:
   a heat exchanger receiving refrigerant flow at high pressure from said condenser and delivering said high pressure refrigerant to said flow metering device, said low pressure refrigerant flowing from said flow metering device to said evaporator and return flow from the evaporator being delivered to said heat exchanger at low pressure, said low pressure refrigerant being in heat exchange relationship with said high pressure refrigerant flow in said heat exchanger.

17. Refrigeration system as in claim 16, wherein said control valve is between said heat exchanger and said compressor inlet.

* * * * *